(12) United States Patent
Kaundinya

(10) Patent No.: US 7,450,952 B1
(45) Date of Patent: Nov. 11, 2008

(54) SYSTEM AND METHOD FOR IMPLEMENTING A RADIO FREQUENCY IDENTIFIER (RFID) TOPOLOGY

(75) Inventor: Murali P. Kaundinya, Bridgewater, NJ (US)

(73) Assignee: Sun Microsystems, Inc., Santa Clara, CA (US)

( * ) Notice: Subject to any disclaimer, the term of this patent is extended or adjusted under 35 U.S.C. 154(b) by 980 days.

(21) Appl. No.: 10/786,528

(22) Filed: Feb. 25, 2004

(51) Int. Cl.
*H04Q 7/20* (2006.01)
(52) U.S. Cl. .................................. 455/456.1; 340/10.32
(58) Field of Classification Search .............. 455/456.1; 340/10.2, 10.32, 10.6, 5.92
See application file for complete search history.

(56) References Cited

U.S. PATENT DOCUMENTS 6,486,769 B1 * 11/2002 McLean ................... 340/10.32
2005/0219039 A1 * 10/2005 Allen ......................... 340/10.2

* cited by examiner

*Primary Examiner*—Vincent P. Harper
*Assistant Examiner*—Phuoc Doan
(74) *Attorney, Agent, or Firm*—Brooks Kushman P.C.

(57) ABSTRACT

Deployment of an RFID system in a business entails a thorough analysis of the 3-dimensional topography in which it is deployed. A deployment field may have multiple floors, multiple entries, multiple exits, and multiple zones and fronts. A graphical deployment application, or visual design tool, provides a graphical representation of the deployment area. Such an application allows visual manipulation of the RFID components in the area to generate realtime graphical feedback about the operation of the dynamically configured deployment. The graphical user interface (GUI) based application receives parameters and variables defining the deployment area and the attributes of the transceivers and transponders for deployment therein. The application identifies a zone of readability of transponders in an area and visually displays such a zone along with the RFID components to determine placement of transceivers accordingly. A normalized scripting language, such as XML, allows definition of the RFID components, which allows a user to manipulate the RFID components in a graphical manner to identify an optimal operating configuration which uses the fewest transceivers to provide transponder coverage.

28 Claims, 10 Drawing Sheets

SYSTEM AND METHOD FOR IMPLEMENTING A RADIO FREQUENCY IDENTIFIER (RFID) TOPOLOGY

BACKGROUND OF THE INVENTION

Radio Frequency Identification (RFID) systems automate the process of locating and tracking objects throughout a deployment area such as a warehouse or retail establishment. Such RFID systems employ a network of transceivers and transponders interconnected to a central control station. Generally, the transceivers detect the presence of transponders within range, and obtain an identification (ID) corresponding to the detected transponder from a return transmission or reflection from the transponders. Typically, the transponders are affixed to a product, stock item, or movable object and the transceivers are disposed in a known location. By correlating the ID of the transponder with the position of the transceivers returning the IDs, the control station determines the placement of each of the transponders, and therefore the location of the corresponding object.

In a deployment environment, typically a business having stores of products for wholesale distribution or retail sale, RFID technology is an emerging area which may soon be deployed globally. RFID technology is employed with computer systems, radio-frequency equipments such as transceivers, antennae, transponders and substantial software components both in firmware and application software. As is typical with new technology, RFID systems should, ideally, integrate seamlessly and quickly into other existing tracking systems. In new installations, it should be simple and easy to install and use not just from a hardware perspective but also from a firmware and software perspective. In both situations, an ideal RFID system should be easy to design, program, modify and deploy. RFID systems should be agile matching the pace of business. Emerging RFID systems and applications should be easy to program irrespective of the different topographic configuration in the field of deployment.

SUMMARY

Configurations of the invention are based, in part, on the observation that conventional deployment of RFID components such as transceivers, transponders, and controllers relies on manual assessment, configuration and placement for the area, or deployment field, in which the RFID system is deployed. Manual measuring techniques, such as tape measure and operator infrared devices, define the perimeter and volume of such a deployment field. An operator then manually enumerates objects and barriers in the area, such as posts, shelves, and walls, and then manually configures placement of the transceivers based on reflectivity parameters of an expected transponder and assumptions about the placement, orientation and density of the transponders in the deployment field. Such manual configuration and resulting deployment is susceptible to inaccuracies from improper calculations, estimates of transceiver parameters, and the time and effort involved with modifying the configuration to adapt to changes in the deployment area, such as moving a shelf or transceiver.

Implementation of RFID systems suggests changes and adjustments to existing infrastructures both on the physical side (e.g. product and stock arrangement and organization) and the information technology side (e.g. processing sensory input). In order for such systems to become adopted and used by businesses they have to demonstrate ease of use and development. In the current emerging state, such systems and applications may not be well received for use by non-technical and software challenged end users.

Deployment of an RFID system in a business entails a thorough understanding of the 3-dimensional topography in which it is deployed. A deployment field may have multiple floors, multiple entries, multiple exits, multiple zones and fronts. All such parameters are to be taken into account while identifying the set of RFID-readers, antennae, RFID-tags, software systems applications, alerts etc. The choices of these components are influenced by the topographic layout of the business area. The network architecture including gateways to the Internet, back-end infrastructure, security-requirements, and others need to be taken into consideration along with the topographic layout to build a final RFID solution.

Accordingly, configurations of the invention substantially overcome the above described shortcomings of RFID deployment mechanisms by providing a normalized, graphical deployment application, or visual design tool, which provides a graphical representation of the deployment area Such an application allows visual manipulation of the RFID components in the area to generate realtime graphical feedback about the operation of the dynamically configured deployment. The graphical user interface (GUI) based application receives parameters and variables defining the deployment area and the attributes of the transceivers and transponders for deployment therein. The application identifies a zone of readability of transponders in an area and visually displays such a zone along with the RFID components to determine placement of transceivers accordingly. A normalized scripting language, such as an XML based format, allows definition of the RFID components and associated attributes (parameters), which thereafter allows a novice user to manipulate the RFID components in a graphical manner to identify an optimal operating configuration which uses the fewest transceivers to provide complete coverage of the transponders in the expected deployment area.

In an operating field or deployment area, such as an office, warehouse, or industrial campus, for example, transponders affixed to objects are trackable by transceivers disposed at various locations around the area. Transponders may be affixed to individual items or products, palates, vehicles, or other objects depending on the level of granularity sought. As the transponders, and the corresponding appurtenant object to which they are affixed, travel within the deployment area, different transceivers sense the transponder, depending on the zone of readability of the transponder. Deploying the transceivers to correspond to locations allows tracking of the transponder and appurtenant object from location to location within the area. Further, enumeration of the transceivers and location relative to other locations allows definition of relations between the areas. Such relations allow predetermined responses to transporting of an object from one location to another. For example, in a retail supermarket context (area), a relation may be defined to track a purchaser of hot dogs, and display an ad for hot dog buns when the purchaser approaches the bakery aisle.

Such configuration of RFID-systems from hardware, software and application perspectives depends on business processes which are subject to real-time change, and would benefit accordingly from real-time response. For example, a retail store may want to track and obtain alerts on the purchase of commodity A and B in the morning hours in the eastern time zone and alert its chains in the central, mountain or pacific time zones respectively. If there were to be an FDA recall of a certain medicine, drug stores in all time zones need to be notified and be able to react. Such alerts and business intelligence have to be integrated and deployed into the compute components within the RFID systems in any geographical layout. The business logic and inference can either be executed physically at distributed computing components or in a centralized computing location. Either way, such computations track mobility of objects. While conventional methods allow tracking via well known paper trail and inventory accounting techniques to track and store all of this data passively with data warehousing, id would be beneficial to respond to the need and opportunity to track objects in real-time. Business processes and their changes need to be reflected and implemented immediately into business logic.

In further detail the method for identifying topology for RFID deployment involves receiving spatial parameters of an area operable for RFID management, and identifying attributes of transceivers operable within the area for RFID management. The transceivers are operable for communication with a plurality of transponders, which respond to signals sent from the transceivers with the RFID of the transponder. A deployment application determines a location for disposing each a plurality of the transceivers within the area by computing, based on the identified attributes, a readability zone for each of the plurality of transponders indicative of readability by a transceiver, and calculating, based on the readability zone and the spatial parameters, placement for each of the transceivers within the area. The resulting calculated placement providing transponder coverage for all or substantially all transponders within the area.

The deployment application computes the readability zone by identifying spatial modifiers for a particular transceiver, and applying the identified spatial modifiers to the identified attributes to generate deployment attributes. The deployment attributes indicate how "readable" the transponder is in the area, taking into account such factors as the angle of reflection to the transceiver and density of the objects to which the transponders are affixed. The deployment application then permits modification of the placement of at least one of the transceivers according to the generated deployment attributes. Accordingly, the identified transceiver attributes further include a range, and computing the readability zone includes identifying a reflection from the transponder. The deployment application adjusts the readability zone based on an interference effect from the type of transponder coverage material, and adjusts the placement of the transponder according the adjusted readability zone and the resulting effect on the range. Therefore, in particular configurations, disposing the transceivers further includes computing the zone of readability for each of the transponders, and identifying the locations to include the transponders, such that each of the transponders in communication with at least one of the transceivers.

The deployment application identifies a plurality of locations in the area, in which each of the locations having a corresponding transceiver. The deployment application computes the effect of disposing each of the transponders in a particular location, in which each of the transponders is appurtenant to a predetermined object such as a retail or stock item. The resulting script file generated by the deployment application allows an operator or user to dispose the corresponding transceiver in each of the identified locations, in which the transceivers are disposed in communication with the transponders disposed in that location.

In particular arrangements, the deployment application specifies the disposition, or placement, of transceivers to cover the area by aggregating, for each of the transponders, the readability zone of each of the transponders, and demarcating a location so as to maximize inclusion of the zone of readability of each of the transponders in the demarcated location. The deployment application then disposes the transceiver corresponding to the location such that the transceiver is in the zone of readability for a substantial maximum of the transponders in the location.

The deployment application analyzes the area for deployment of transceivers by identifying a plurality of locations, in which each location is associated with one or more other locations. The deployment application then identifies portals connecting each location to another location, in which the portals defining relations between the locations. The deployment application receives the spatial parameters defining the area including an outer perimeter boundary of the area, locations defined as portions of the area, and the adjacency of each of the locations to other locations. Also, the deployment application receives physical impediments within the area operable to modify the zone of readability of one or more of the transceivers.

In particular configurations, the received spatial information of the area is transmitted in a predetermined format, the predetermined format adapted to represent an arbitrary arrangement of transceivers, transponders, and areas. The deployment application displays the aggregated information to a user in a graphical format, in which the graphical format is operable to illustrate the augmented readability zone for each of the transponders. The deployment application allows a user to interactively select placement of each of the transceivers within the area, in which the placement is operable to generate feedback indicative of transponders having a particular transceiver in the corresponding readability zone.

In particular configurations, the disposed transceivers are employed for spatial based alerts and responsive triggers (operations), involving identifying a particular location and corresponding transceiver, and identifying transponders readable by the transceiver. The deployment application then identifies an adjacent location operable to be accessed from the particular location, and identifies the transceiver corresponding to the adjacent location. The user may define an alert corresponding to detection of an identified transponder being disposed from the particular location to the adjacent location. The user then defines a trigger corresponding to the alert, in which the trigger is operable to invoke an automated responsive action to the alert.

The invention as disclosed above is described as implemented on a computer having a processor, memory, and interface operable for performing the steps and methods for monitoring and processing events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Exemplary configurations of the invention disclosed below describe a system and method for deploying transceivers in an area adapted for RFID-tagged objects. A graphical deployment application provides a graphical representation of the deployment area and allows visual manipulation of the RFID components in the area to generate realtime graphical feedback about the operation of the dynamically configured deployment. The graphical user interface (GUI) based application receives parameters and variables defining the deployment area and the attributes of the transceivers and transponders for deployment therein. The application identifies a zone of readability of transponders in an area and visually displays such a zone along with the RFID components to determine placement of transceivers accordingly. A normalized scripting language, such as an XML based format, allows definition of the RFID components and associated attributes (parameters), which thereafter allows a novice user to manipulate the RFID components in a graphical manner to identify an optimal operating configuration which uses the fewest transceivers to provide complete coverage of the transponders in the expected deployment area.

In the exemplary deployment area, shown, transponders affixed to objects are trackable by transceivers disposed at various locations around the area. Transponders may be affixed to individual items or products, palates, vehicles, or other objects depending on the level of granularity sought. As the transponders, and the corresponding appurtenant object to which they are affixed, travel within the deployment area, different transceivers sense the transponder, depending on the zone of readability of the transponder. Deploying the transceivers to correspond to locations allows tracking of the transponder and appurtenant object from location to location within the area. Further, enumeration of the transceivers and location relative to other locations allows definition of relations between the areas. Such relations allow predetermined responses to transporting of an object from one location to another. For example, in a retail supermarket context (area), a relation may be defined to track a purchaser of hot dogs, and display an ad for hot dog buns when the purchaser approaches the bakery aisle.

Figure 1:
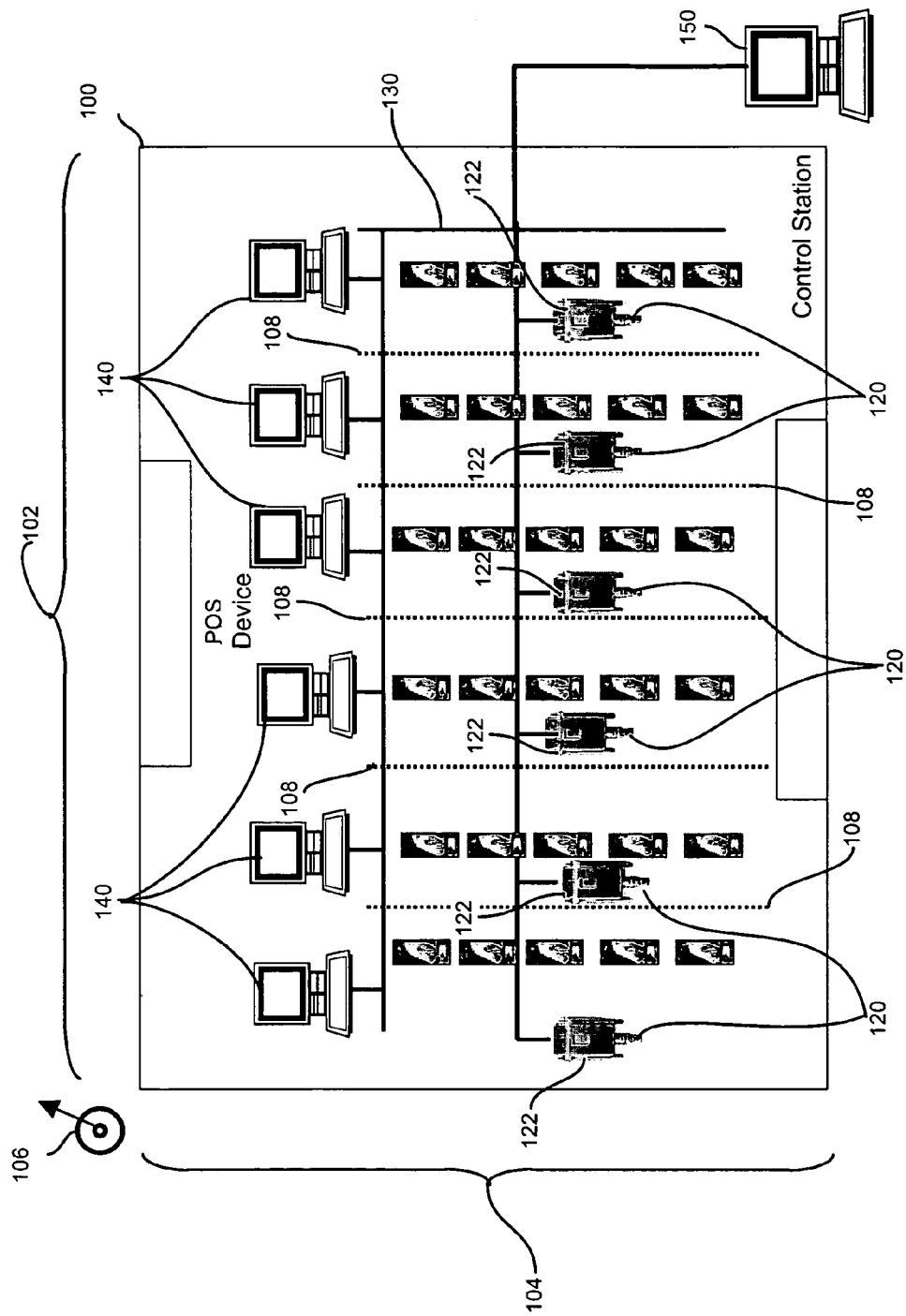
FIG. 1 is a context diagram of an area suitable for implementing RFIDs according to the system of the present invention.

FIG. 1 is a context diagram of an area suitable for implementing RFIDs according to the system of the present invention. Referring to FIG. 1, the area 100 has a width 102, a depth 104, and a height 106, depicting an exemplary sales floor. A sales floor environment lends itself well as illustrative of the user of RFIDs, due to the large number of transportable objects present. For clarity, the area 100 is described in terms of width 102 and depth 104, however the additional dimension of height is applicable by considering additional floors above and/or below the exemplary sales floor 100 depicted by width 102 and depth 104.

A plurality of RFID transponders 110 disposed throughout the area 100 are affixed to objects (not specifically shown) for tracking and monitoring as disclosed herein. Note that the exemplary sales floor 100 environment depicts objects in a retail store context, however the transceivers 110 are affixable to be appurtenant to any object, such as a warehouse palate, vehicle, or other object, and deployment of the transponders 110 may be of a varying density. Within the area 100, a plurality of physical barriers such as shelves 108, or other demarcation of the sales floor area 100 represent delimiters for transport of the transponders in the area 100, and may also affect reading of the transponders 110, discussed further below.

The area 100 includes a plurality of transceivers 120 operable for RF communication with the transponders 110. Alternatively, another form of wireless communication other than RF may be employed. Each of the transceivers 120 couples to a local area network (LAN) 130 via a network interconnect 122, such as a bridge, repeater, or PC operable for LAN 130 communication. The LAN 130 connects each of the transceivers 120 to a control station 150, and to one or more point of sale (POS) devices 140, such as check out stations in the exemplary sales floor area 100. According to a particular configuration, maintaining readability of as many transponders 110 as feasible with the fewest number of transceivers 120 is one objective of the system of the present invention.

The example in FIG. 1, therefore, shows a topographic layout of a retail store using RFID technology and systems. The retail store shown in this example has 6 aisles, demarcated by the shelves 108. These aisles may need and therefore have one or more transceivers depending on their length, breadth and depth. These aisles may have several products each of which may have its own transponder. Items being picked by shoppers may need to be replenished and an order be placed to a supplier. Items being searched for by shoppers need to be located either in the same store or other nearby stores. Items being misplaced by stock-keepers or shoppers need to be corrected and put in the proper sections. Shoppers picking items into their shopping carts need be processed for payment at the checkout zone.

The RFID transceivers 112, therefore, using a connector 122 to the local network 130 are shown coupled to the control station 150 (also referred to as Savant, in particular configurations known to those of skill in the art) in communication with the transceivers 112. In alternate configurations there may be multiple control stations 150 taking their turns to communicate to these transceivers 120 in sequence. The area 100 includes several point of sale (POS) devices 140 that conduct business transactions and it may do so by consulting the control station whenever needed for RFID information. In the exemplary retail sales area 100 discussed below, the POS devices are cashier stations typically equipped with monetary exchange capability for consummating a sale.

Figure 2:
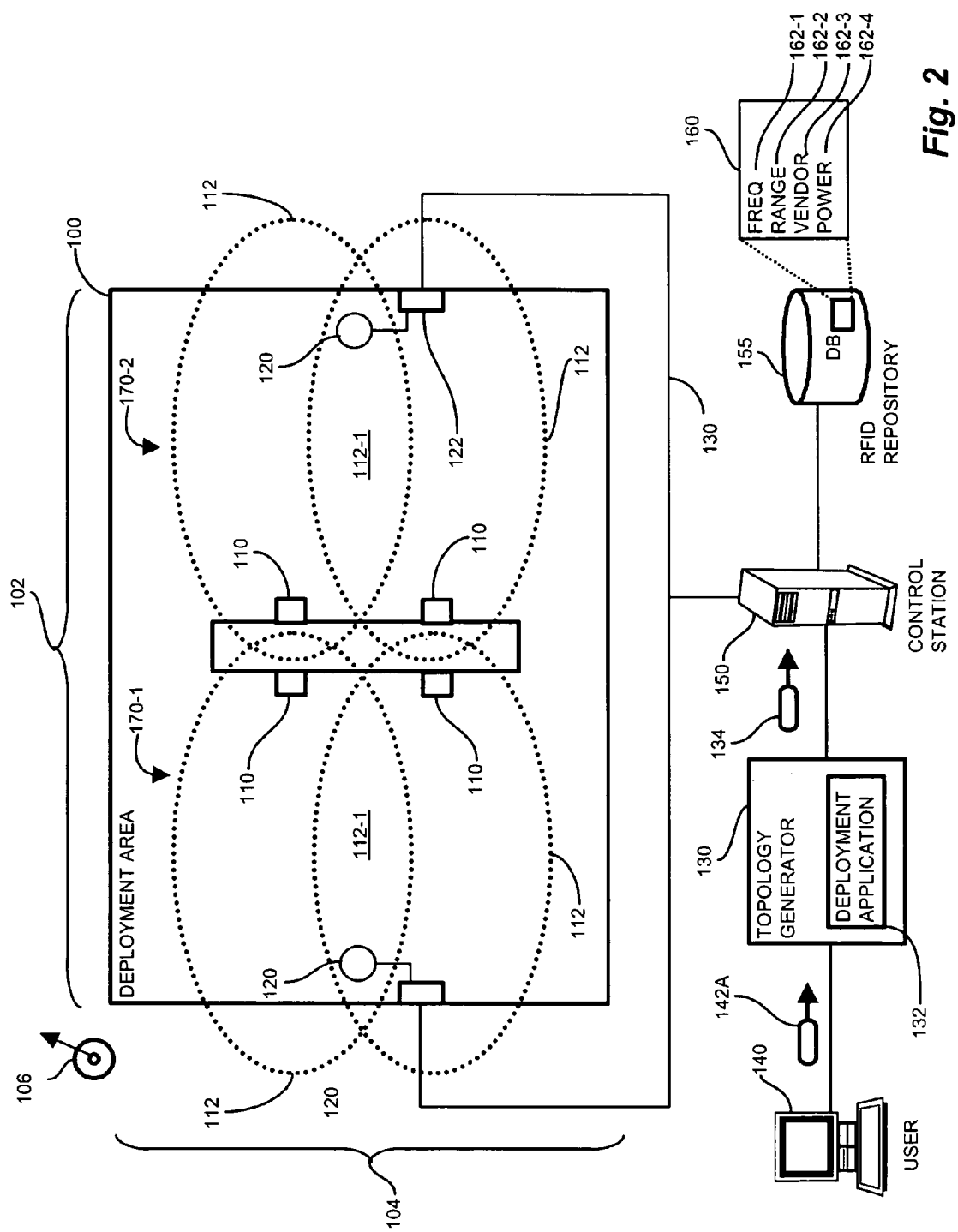
FIG. 2 is a block diagram of RFID deployment in the area of FIG. 1.

FIG. 2 is a block diagram of the transceivers 120 and corresponding RFID 110 deployment in the area of FIG. 1. Referring to FIG. 2, an exemplary configuration of transponders 110 in communication with particular transceivers 120 is illustrated. Each of the transponders 120 has attributes 160, which affect communications with the transceivers 120 as discussed further below, illustrated graphically in FIG. 2. Such a graphical representation allows an operator, via a computing device 140, to optimally select the number of transceivers 120 and transponders 110 based on a topographic floor plan 100. The graphical rendition of the RFID deployed area 100 in conjunction with the deployment application 132 assists a business owner or a systems designer attempting to design such an RFID system for optimal coverage and minimal cost.

Each of the transponders 110 and transceivers 120 have attributes 160, such as frequency 162-1, range 162-2, vendor 162-3, and power requirements 162-4, stored in an RFID repository 160 connected to the control station 150. The attributes 160 are employed to determine a readability zone 112 around each of the transponders 110, indicative of the area within which a transceiver 120 may read the transponder 110. The readability zone 112 may be elliptical, as shown in FIG. 2, because of variations in transponder 110 reflectivity at different angles. Similarly, the range 162-B and power 166-D affect the size of the readability zone 112.

In a large system having many transceivers 120 and transponders 110, possibly from different vendors, identifying and applying the operational attributes to determine the zone of readability 112 for a plurality of transceivers 120 is cumbersome, particularly with components (110, 112) of different vendors. Accordingly, a graphical rendition of the readability zone 112 of each of the transponders 110 along with a graphical representation of the transceivers 120 allows optimal, visual placement of the transceivers 120 for including a maximum number of transponders 110. For example, the transponders 120 disposed in a region 112-1 is included within the readability zone of multiple transponders. Accordingly, a topology generator 130 executes the deployment application 132, either as a standalone computer from the control station 150 or, in alternate arrangements, integrated with the control station 150.

A user 140 manipulates the placement of transceivers 120 for covering different locations 170-1, 170-2 (170 generally) in the area 100, via topographic data 142A, 142B received respectively from the user 140 or from the LAN 130 via the control station 150. The deployment application 132 generates deployment data indicative of transceiver 120 placement in the form of a script file 134, discussed further below with respect to Table I, operable by the control station 150. In this manner, the deployment application 132 operates as a visual design tool to allow the user 140 to visualize the coverage of the area 100 provided by the deployed transceivers and transponders, and store the results in a script file for future manipulations.

Figure 3:
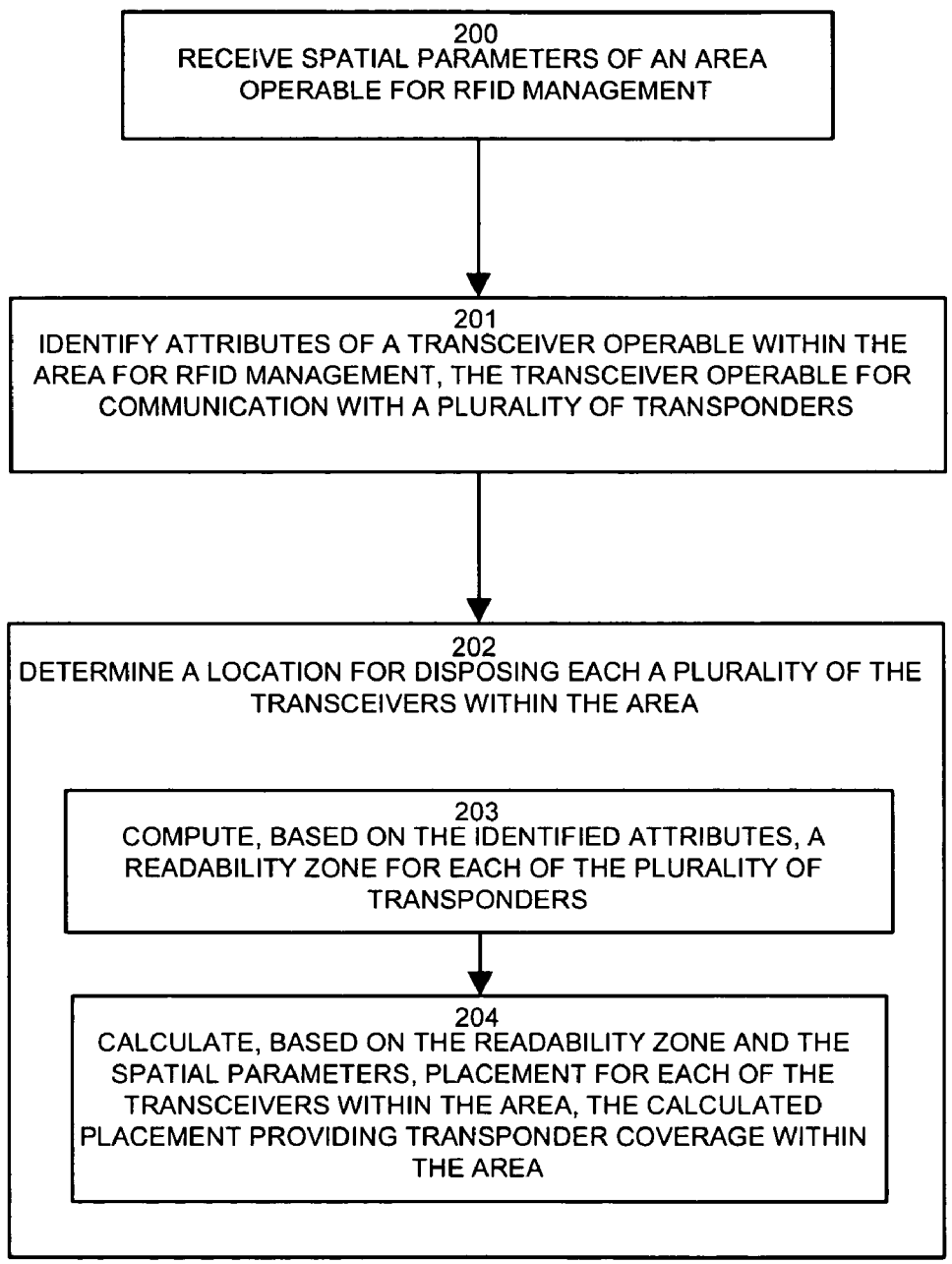
FIG. 3 is a flowchart of the system of the present invention.

FIG. 3 is a flowchart of the system of the present invention. Referring to FIGS. 2 and 3, the method for identifying topology for RFID deployment as disclosed herein involves receiving spatial parameters of an area operable for RFID management, as depicted at step 200. The spatial parameters denote the outer perimeter defined by width 102, depth (length) 104, and height 106, and may also include physical barriers 108 within the area, such as shelves, walls, and structural members.

The topology generator 130 identifies attributes of transceivers 120 operable within the area 100 for RFID management, in which each of the transceivers 120 is operable for communication with a plurality of transponders 110, as shown at step 201. The transceiver 120 attributes 160 include, but are not limited to, transmission frequency 162-1, range 162-2, vendor 162-3 and power 162-4. At step 202, the deployment application 132 determines the location 170 for disposing each a plurality of the transceivers 120 within the area 100. Determination of the location 170 of each of the transceivers further includes computing, based on the identified attributes 160, a readability zone 112 for each of the plurality of transponders, as depicted at step 103. Depending on the transceiver attributes 160, as well as the type and disposition of each of the transponders 120, each transponder 110 has a readability zone 112 within which transceivers 110 may read the RFID of the transponder.

The deployment application 132 calculates, based on the readability zone 112 and the spatial parameters 102-108, placement for each of the transceivers 120 within the area, in which the calculated placement provide sufficient transponder 110 coverage within the area, as shown at step 204. The deployment application 132 therefore displays transponders 110 and the corresponding readability zone 112 in conjunction with transceivers 120 disposed within the readability zone 112 of each of the transponders 110. The user 140 may manipulate the deployment location (disposition) of each of the transceivers 120 such that all, or substantially all of the transponders 110 are covered by one or more transceivers 120. Factors which may affect the ability to cover a particular transponder 110 by a nearby transceiver 120 include the angular orientation of the transponder 110, as reflectivity of the transponder may vary with orientation, and density of the transponders 110, such as a palate of tightly packed, individually tagged objects, and the material properties of the transponder 110 tagged object (i.e. dense objects such as paints and machinery affect readability).

Figure 4:
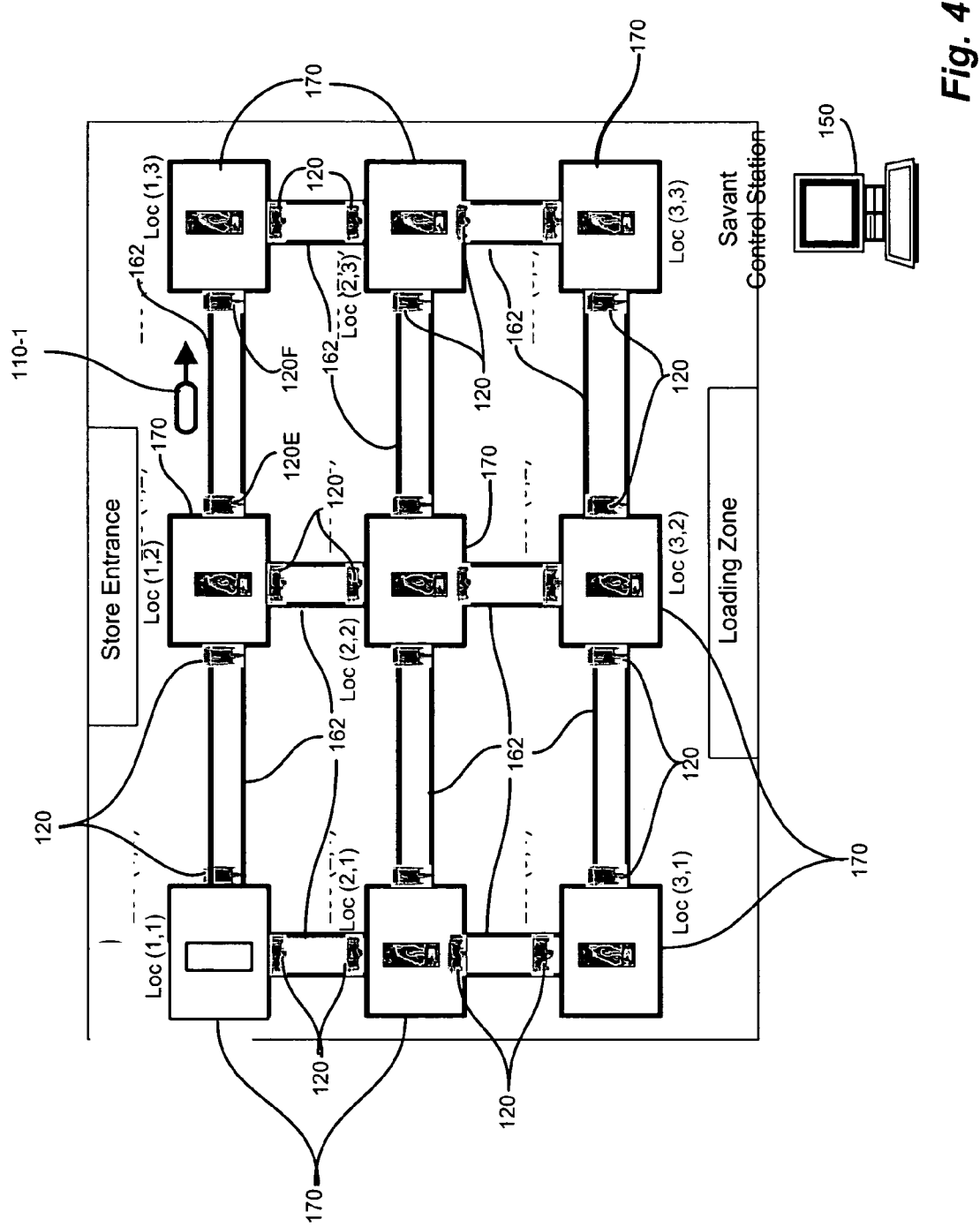
FIG. 4 is a diagram of an area subdivided into locations according to the system of the present invention.
Figure 5:
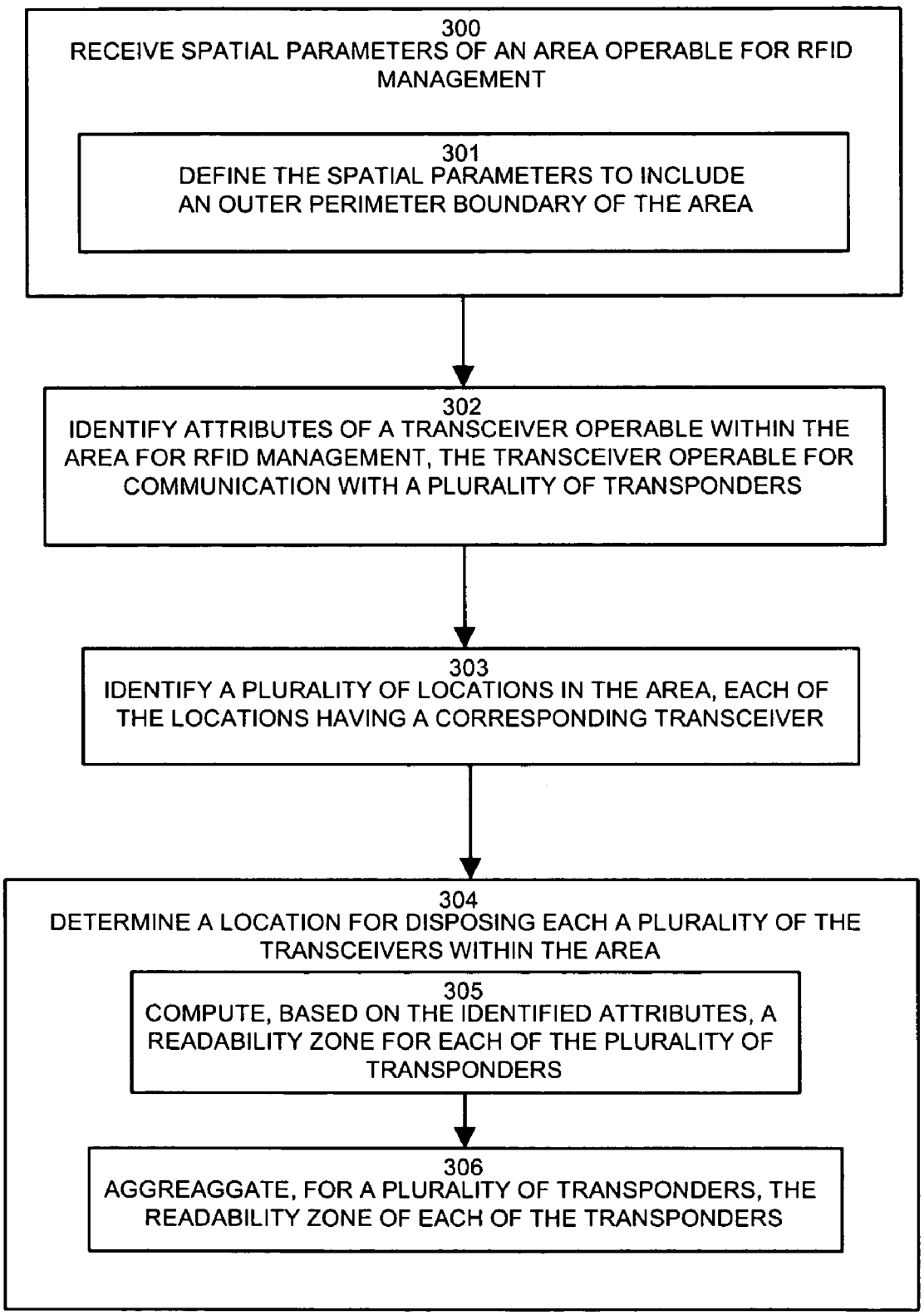
FIGS. 5-9 are a flowchart of RFID deployment as in FIG. 2 in greater detail.
Figure 6:
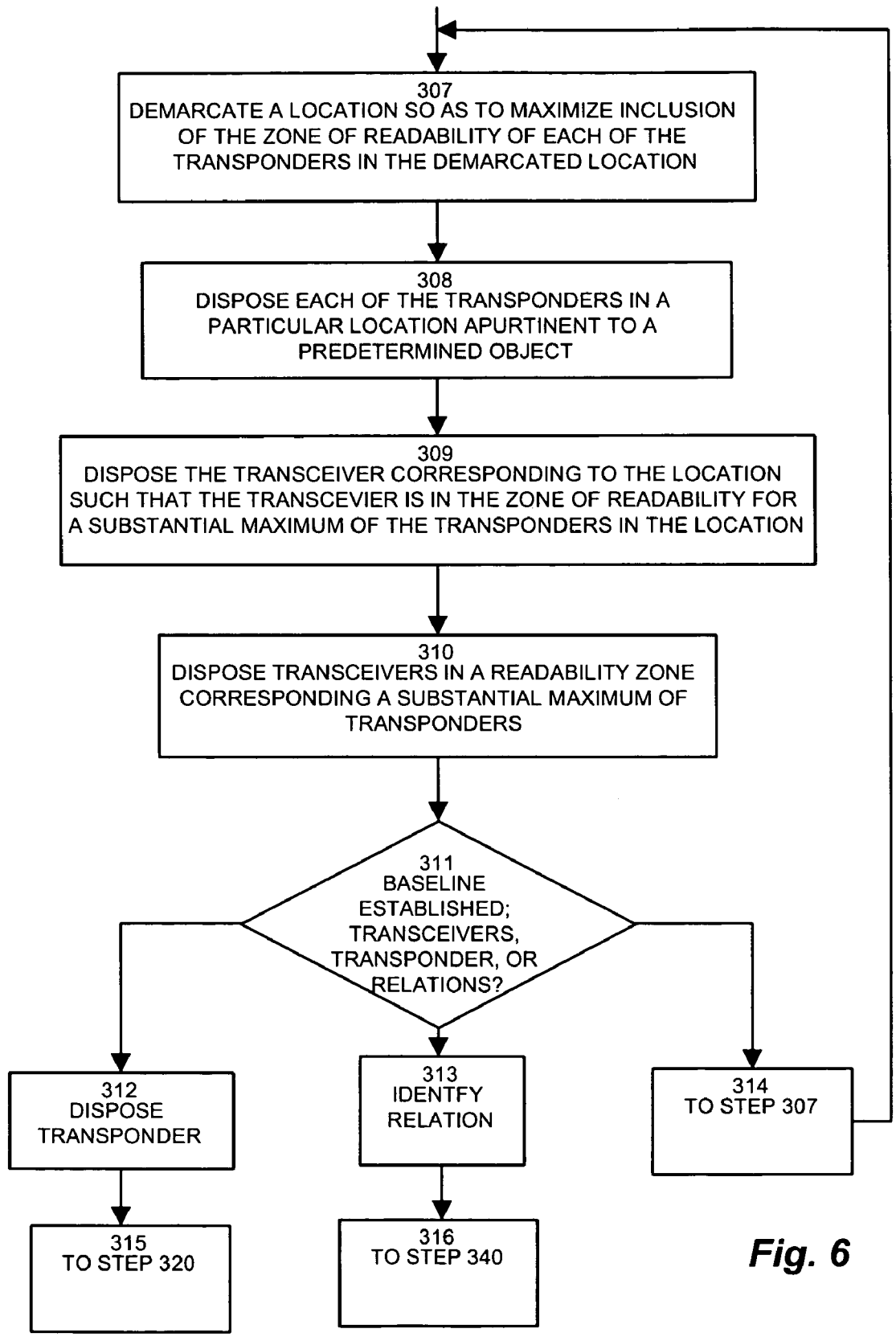
Figure 7:
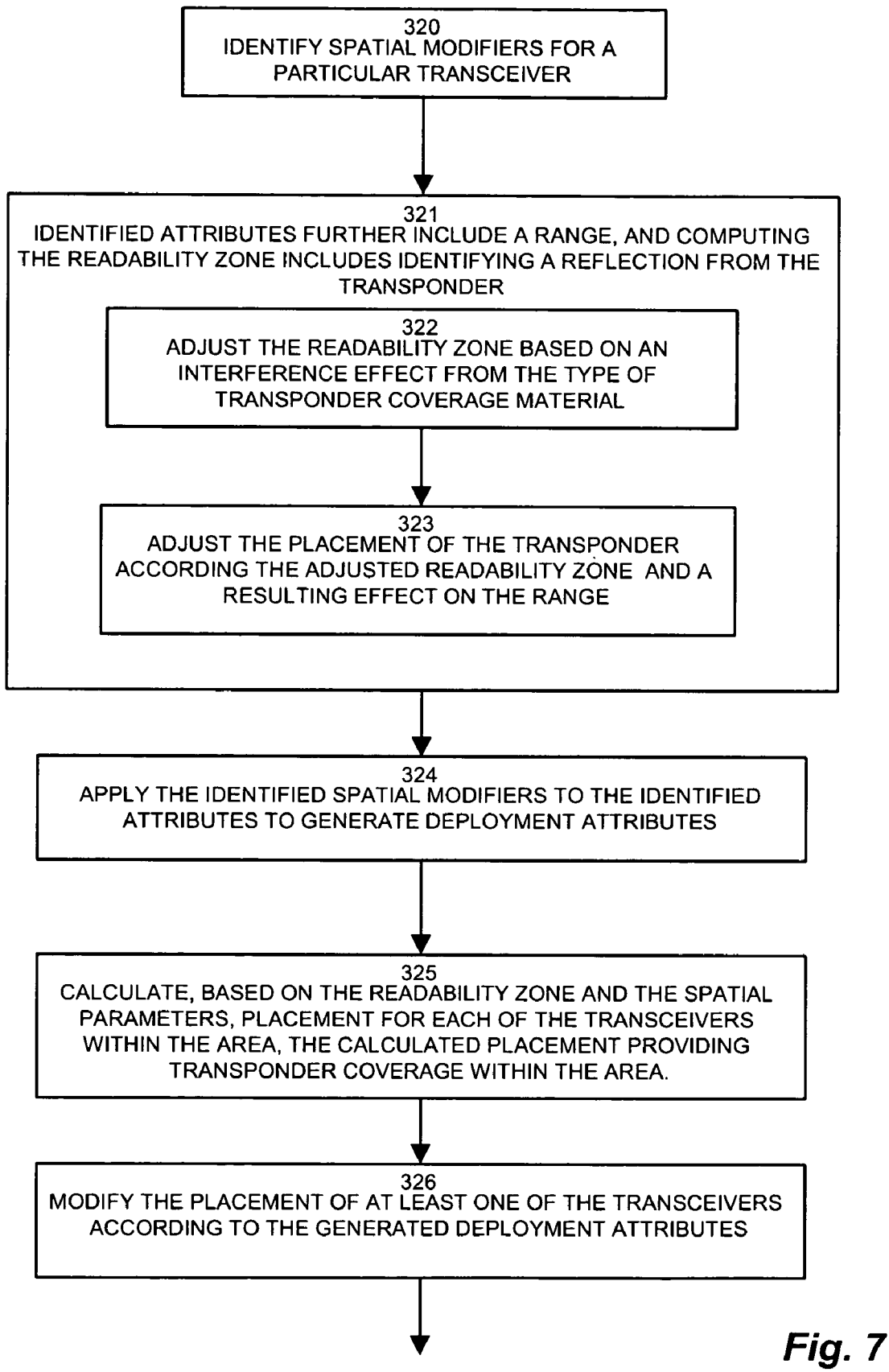
Figure 8:
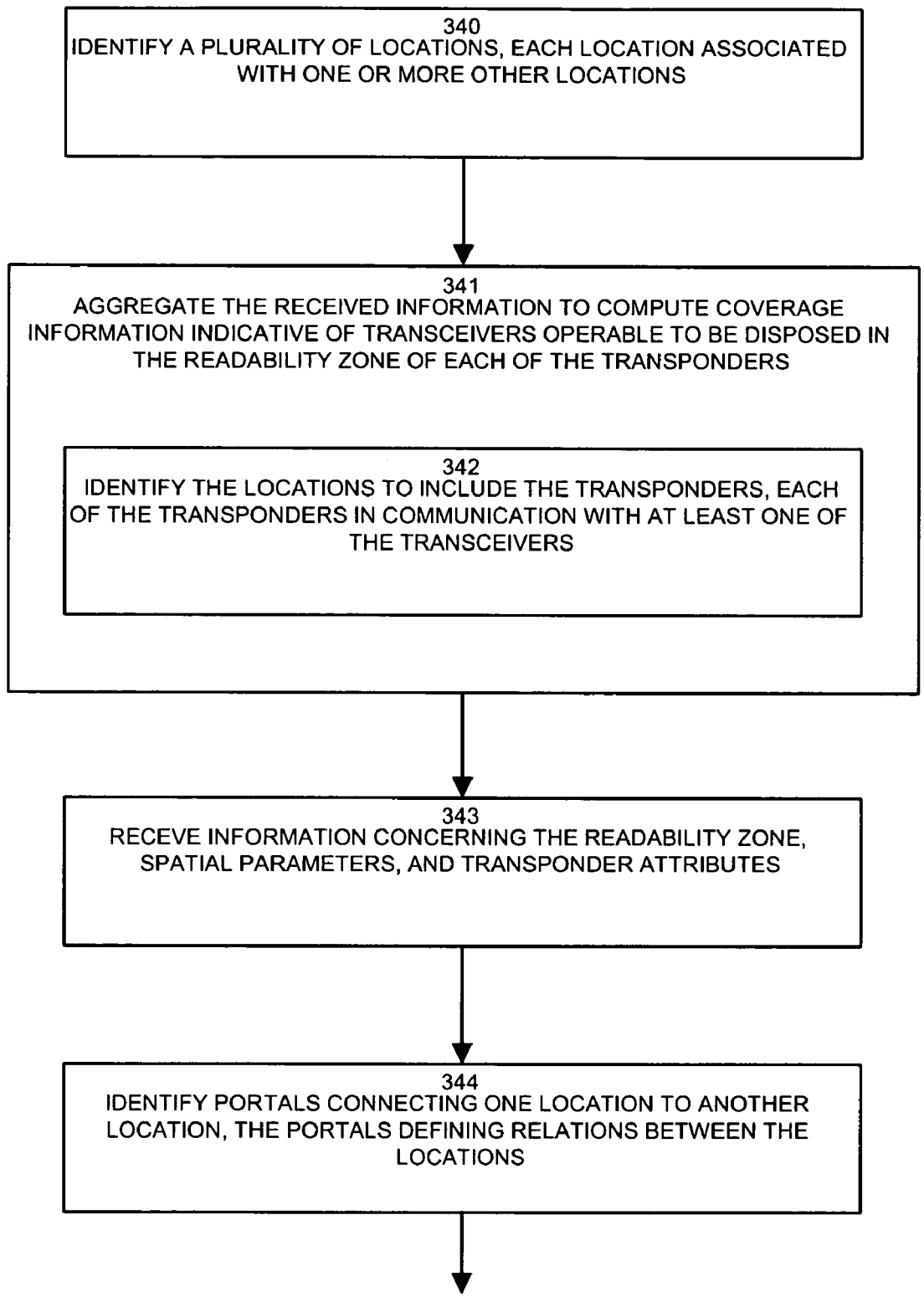

FIG. 4 is a diagram of an area subdivided into locations 170 according to the system of the present invention. As indicated above, the deployed transceivers 120 interoperate within the area 100 under the control of the control station. The deployment of the transceivers 120 along with physical barriers such as aisles and or shelves 108 define adjacency between the transceivers 120 and the corresponding locations 170. The adjacency is expressible as a graph or chart indicating available relations, or paths 162, from location 160 to location 160. The paths 162, or portals, between the locations are show illustratively as elongated, however in actuality may be smaller or insignificant in length. The relation therefore indicates a transponder 110 traveling between locations 170, as detected by the transceivers 120 corresponding to the relation. A user (via user device 140) may further define an alert to correspond to a relation and a particular transponder. The alert therefore indicates movement of the particular transponder from one location 160 to another, according to the relation. When the transponder is appurtenant to a particular product, such an alert may indicate that selection of a transponder tagged product by a customer. Further, although the exemplary area 101 shows transceivers 120 at each ingress and egress point of a location 162, an alternative approach places a single transceiver 120 in each location.

Responsive to the alerts, the user may define triggers, which are operations corresponding to an alert and operable to be performed (i.e. executed) upon the alert. Such triggers may be advertising or promotions, if the alert indicates selection of an item placing a particular product (transponder) in a cart. The alerts may further indicate inappropriate transport of transponder tagged items, such as shoplifting prevention. Alternatively, in a warehouse environment, alerts may indicate inappropriate placement of an object or palate.

For example, in an exemplary retail sales area 100, such as in a grocery store area 100, a relation may indicate a path from the deli section to the bakery section. An alert may be defined as detecting a transponder affixed to hot dogs, therefore indicating a purchase of hot dogs and a customer moving into the bakery section. A corresponding trigger may be the display or announcement of an advertisement for hot dog buns. In another example, such as a home improvement store context, a relation between the power tool section and the fasteners section defines an alert concerning a pneumatic nail gun. The corresponding trigger invokes an action to announce nails for operation in the nail gun, occurring as the purchaser of the nail gun moves into the fastener aisle.

Continuing to refer to FIG. 4, an area 101 includes nine locations 170 in a 3*3 arrangement, identified as Loc (1 . . . 3, 1 . . . 3). Each of the locations 170 connects to one or more other locations 170 via a portal 162. At the ingress and egress points of each of the locations 170, a transceiver 120 and corresponding network interconnect 122 are disposed, labeled as transceiver 120A . . . 120X. A user or customer having an object with a transponder 110-1 and moving from Loc(1,2) to Los (1,3) activates transceiver 120E first, then transceiver 120F upon entering location 160 Loc(1,3). Given the example above, transceiver 120E detecting the hot dog transponder 110-1 moving toward Loc(1,3) may employ the control station 150 to direct transceiver 120F to look for the transponder 110-1, as per the alert, and perform the trigger to advertise hot dog buns accordingly.

FIG. 4, therefore, shows an exemplary business design scenario using the deployment application (visual design tool) 132 as discussed herein to provide a template to capture the topographic details and the floor plan of the business area. The visual tool allows for the specification of the aisles or sections with their height, breadth and depth. The visual design tool 132 provides recommendations to select the right kinds of transceivers 120 and transponders 110 while taking into account the constraints and restrictions imposed by the topographic floor plan 101. This visual tool 132 creates a formal description of the topography, the physical location of the transceivers 120 and their characteristics (parameters) 160. This formal description is available for computer systems to draw inferences on the relationships of transceivers 120 to their neighbors (adjacent transceivers).

In FIG. 4, the exemplary area 101 is a business area having a floor plan depicting a floor area which may be distributed across multiple floors. This 3 dimensional area includes zones or locations 170, each of which may correspond to a cohesive and logical functionality to the business. The deployment application addresses the technical problem of visualizing the relationship between mobile objects and static objects and dynamically generating the alerts and inferences that the application 132 may be deploy based on a zone of interaction, or thresholds, between multiple locations 170. Generally, each of the locations 170 is distinguishes adjacent locations 170 by the demarcation where the transponder 110 transitions out of range of one transceiver 120 and into the range of the transceiver in the adjacent location 170. It is beneficial to be able to visually model these relationships and express them in a prescriptive language. It is also desirable to minimize the amount of software programming to translate these alerts from corresponding business logic.

The topography of this business area in FIG. 4 is described by x, y and z axes. This 3 dimensional topographical area comprises of zones each of which is connected to one or more of its neighboring zones. In FIG. 2, an object in Loc (1,1) can move to either Loc(1,2) or Loc (2,1). Likewise, an object in Loc (2,1) can either move to Loc (1,1) or Loc(3,1) or Loc (2,2). The floor topography and the creation of these locations by a business process constrains the movement of an object and should therefore be easy to track. Once objects' physical locations are tracked, its relationships with other objects in neighboring locations can be computed dynamically and quite easily. By using the visual modeling tool, a user 140 describes the topographic floor plan with the aid of templates, and visually defines the constraints between these locations 170 to ensure the correct configuration of transceivers 120 that can track the entry and exit of objects between these locations 170. If there is ambiguity either in modeling such a portal 162 for the correctness of the entry and exit detection or in the strength of the transceiver 120 signals and their range to cover the zone of entry and exit, this visual design tool 132 will assist by clarifying the parameters 160 such as range 162-2 applied to the area 101. Once such design issues are resolved, the visual design tool 132 produces a formal description of these zones (locations) 170, their port of entry, their port of exit, the transceivers controlling these ports, and other parameters. This formal description is codified in the script file 134 and is employable to visually reconstruct the topography.

With such a visual deployment application tool 132, it becomes possible to visually associate objects preloaded into these locations 170 using a data store such as the repository 155. It is also possible to visualize by simulation the relationship(s) between any alien object and an object within a location, with reference to the corresponding transponders 110. With the outcome of such assimilation, it now becomes possible to define alerts and triggers upon the entry and exit of objects through those ports of entry and exit respectively. Once these alerts and triggers are defined visually, such alerts and triggers become represented into a formal prescriptive application language, such as XML described further below. It thus becomes possible to auto-generate the entire RFID application without direct code development, i.e. the user need not write any software programs. This auto generated application defined by the script file 134 may create components and code to generate alerts when it recognizes a pre-described or pattern governing the relationships between objects and the topology in the operating field or the deployment zone. It is also possible to dynamically define just the alerts and triggers visually and have the application logic be deployed instantaneously to govern the behavior of transceivers based on objects crossing the port of entry and exit. The deployment application 132 therefore shields the end-user from being burdened with software programming tasks and instead permits focus on the business aspects.

FIGS. 5-9 are a flowchart of RFID deployment as in FIG. 2 in greater detail. The exemplary flow depicts operations and manipulations which allow a user to deploy RFID transceivers within an area. The flow presented is exemplary, and may be performed by a graphical user interface (GUI) under the control of the user. Alternative GUI flow and operations may be employed in alternate configurations.

Referring to FIGS. 4-9, RFID deployment includes receiving spatial parameters 102-108 of an area 101 operable for RFID management at the topology generator 132, as depicted at step 300. The spatial parameters include an outer perimeter boundary of the area 10 (i.e. length, depth and height), locations defined as portions of the area 101, the adjacency of each of the locations 170 to other locations 170, and any physical impediments 108 within the area operable to modify the zone of readability 112 of the transceivers 110, as disclosed at step 301. At step 302, the topology generator 130 identifies attributes 160 of the transceivers 120 operable within the area 101 for RFID management. The attributes 162 may be obtained from a configuration file (not specifically shown), manually entered by the user 140, or downloaded directly from the transceivers 120, and the manner of obtaining the attributes may differ from vendor to vendor.

The deployment application 132 then identifies a plurality of locations 170 in the area 101, in which each of the locations has a corresponding transceiver. The locations 170 represent a physical subdivision of the area 101, although may have overlapping and/or noncoverage areas, which the user may address using the deployment application 132, discussed further below.

Each of transceivers 120 is operable for communication with a plurality of transponders 110. At step 304 the deployment application 132 determines a location 170 for disposing each of the transceivers 120 within the area 101, in which the determination includes computing, based on the identified attributes 160, a readability zone 112 for each of the transceivers, as depicted at step 305, and aggregating the readability zone 112 of each of the transponders, as shown at step 306. Since the readability zone 112 of multiple transponders may overlap, a graphical display of the overlap 112-1 illustrates locations 170 from which multiple transponders 110 are readable.

Having received and normalized each of the transceivers 120 in an initial location 170, the deployment application 132 allows refinement to the initial deployment via an iterative process. Accordingly, using the spatial parameters 102-108, the deployment application 132 demarcates a location 170 corresponding to each of the transceivers 120 so as to maximize inclusion of the zone of readability 112 of each of the transponders 110 in the demarcated location 170. Each of the transceivers 120 corresponds to a location 170. The location 170 therefore follows the transceiver 120, and may be by a drag-and-drop format via the deployment application 132 or other mechanism.

The user 140 then disposes each of the transponders 110 in a particular location 170, in which each of the transponders appurtenant to a predetermined object, as disclosed at step 308. The appurtenant object is typically a stock, warehouse, or retail item which the control station 150 maintains and tracks. After disposing the transponders 110, the deployment application 132 allows the user 140 to modify each of the locations 170 by disposing the transceiver 120 corresponding to the location 170 such that the transceiver 120 is in the zone of readability 112 for at least a substantial maximum of the transponders 110 in the location, as disclosed at step 209. Ideally, the transceiver 120 occupies a physical location 170 within the zone of readability 112-1 for all transponders 110 in the location 170. Such adjustment of the transceiver 120 is a fine-tuning of the physical deployment location 170 following deployment of the transponders 110, and may follow an iterative cycle, as will be discussed below.

At step 310, an iterative refinement process commences which allows the user 140 to refine the deployment by adding and modifying the transponder 110 and transceiver 120 elements. The user 140 has established a current baseline via the deployment application 132 to arrange transceivers 120 such that each of the transceivers 120 is disposed in a readability zone 112 corresponding the substantial maximum of transponders 110, and a substantial minimum number of transceivers 120 are disposed in the area 101 such that substantially all of the transponders 110 are communicative with at least one transceiver 120 in the corresponding zone of readability 112, as depicted at step 310.

At step 311, an initial baseline is established and refinements and or modifications may occur to the placement, either by manual or automated mechanisms. In the exemplary deployment application 132, user input 142A directs the modifications to the baseline to generate the completed deployment script 134, however automated operations and programming may apply in alternate configurations.

The deployment application 132 receives user input 142A and determines whether to add/modify transceivers 120, dispose transponders 110, or identify relations between transceiver 120 locations 170, as depicted at step 311. If the user 140 elects to add additional transceivers 120 or modify placement of existing transceivers 120, control reverts to step 307 above. If the user 140 input directs the application 132 to dispose transponders 110 in the area 101, then control passes to step 320, below. If the user 140 input specifies relation definition, then control passes to step 340, below.

At step 320, the deployment application 132 identifies spatial modifiers (i.e. physical barriers 102-108) for the transceivers 120 which affect reading of particular transponders, such as shelves, walls, posts, etc. The deployment application 132 then gathers the identified attributes of the transceivers 120, as depicted at step 321, in which identified attributes 160 further include a range of the transponders. The readability zone 112 depends on the range of the transceiver 120 and the placement of the transponder 110. Since the transponder 110 readability zone 112 is affected by the orientation of the transponder 110 and the properties of the materials upon which it is disposed, computing the readability zone 112 includes identifying a reflection from the transponder. The deployment application therefore adjusts the readability zone 112 based on an interference effect from the type of transponder coverage material, as depicted at step 322. The user may then adjust the placement of the transponder 110 according the adjusted readability zone 112 and the resulting effect on the range 162-2.

The deployment application 132 then uses the identified spatial modifiers and applies the identified spatial modifiers to the identified attributes to generate deployment attributes, as depicted at step 324. Such deployment attributes indicated, for example, walls or posts which may not be read through. The deployment application 132 then calculates, based on the readability zone 112 of the transponders 110 and the spatial parameters, placement for each of the transceivers 120 within the area, in which the calculated placement provides transponder coverage within the area. As indicated above, a transponder 110 may not provide maximum reflectivity at all angles, hence the ellipsoid readability zone 112. Further, transponders 110 affixed to dense materials such as liquids and machinery may be subject to interference. Therefore, the transceiver 120 placement is employed to dispose the transponders 110 in areas where they are readable by a transceiver 120. The user 140 may then modify the placement of at least one of the transceivers 120 according to the generated deployment attributes, as shown at step 326, by returning to step 311.

If the user 140 elects to identify relations at step 311, then the deployment application 132 identifies a plurality of locations 170, in which each location is associated with one or more other locations 170, as depicted at step 340. The deployment application 132 aggregates the received information to compute coverage information indicative of transceivers 120 operable to be disposed in the readability zone of each of the transponders 110, as disclosed at step 341. Accordingly, employing the disposed transceivers 120, the deployment application 132 computes the zone of readability 112 for each of the transponders, and identifies the locations 170 to include the transponders 110, such that each of the transponders 120 is in communication with one or of the transceivers 120, as depicted at step 342. Therefore, the area 101 is subdivided into locations 170 according to the transceivers 170, such that the transponders 110 in the location 170 are readable by the transceiver 120 in that location 170.

The deployment application 132 receives the information concerning the readability zone 112, spatial parameters, and transponder attributes 160 for each location 170, as depicted at step 343, and identifies portals 162 connecting one location 170 to another location 170, in which the portals 162 define relations between the locations 170. Generally, locations 170 are adjacent to each other, such that exiting one location 170 will deterministically place the transponder 110 in the adjacent location 170 defined by the portal 162, as discussed regarding the graphs above. The locations may have a single transceiver 120 or a transceiver 120 disposed at each entry and exit defined by a portal 162, as shown in FIG. 4.

The deployment application 132 begins an iterative process of defining relations by identifying a particular location 170 and corresponding transceiver 120 or transceivers, as depicted at step 345. The deployment application 132 then identifies adjacent locations 170 operable to be accessed from the particular location 170, as shown at step 346. The adjacent locations accessible from the particular locations define the relations. The deployment application 132 identifies the transponders 110 in the particular location 170, for which a relation is to be associated, as disclosed at step 347. The deployment application 132 identifies the transceiver 120 or transceivers corresponding to the adjacent location 170, thereby establishing the relation, as shown at step 348. The user 140 defines an alert corresponding to detection of an identified transponder 110, from step 347, being disposed from the particular location 170 to the adjacent location 170, as shown at step 349. The alert therefore indicates that a particular transponder 110 travels out of the range of one transponder and into range of another transponder, hence moved from one location 170 to another location 170. The deployment application 132 then defines a trigger corresponding to the alert, in which the trigger is operable to invoke an automated responsive action to the alert. Such an automated response may be the announcement or advertisement for hot dog buns or nails, in the examples above.

As indicated above, the defined alert corresponds to a responsive action to occur when a transponder is transported from one location to another, as evidenced by passing from the range of one transceiver 120 to another. Such a triggered responsive action is typically a software driven response invoked by the control station 150, such as the automated hot dog bun and pneumatic nail ad described above. However, alternate triggers are applicable to a variety of applications, as suited to the area 101 and the control station 150.

Figure 9:
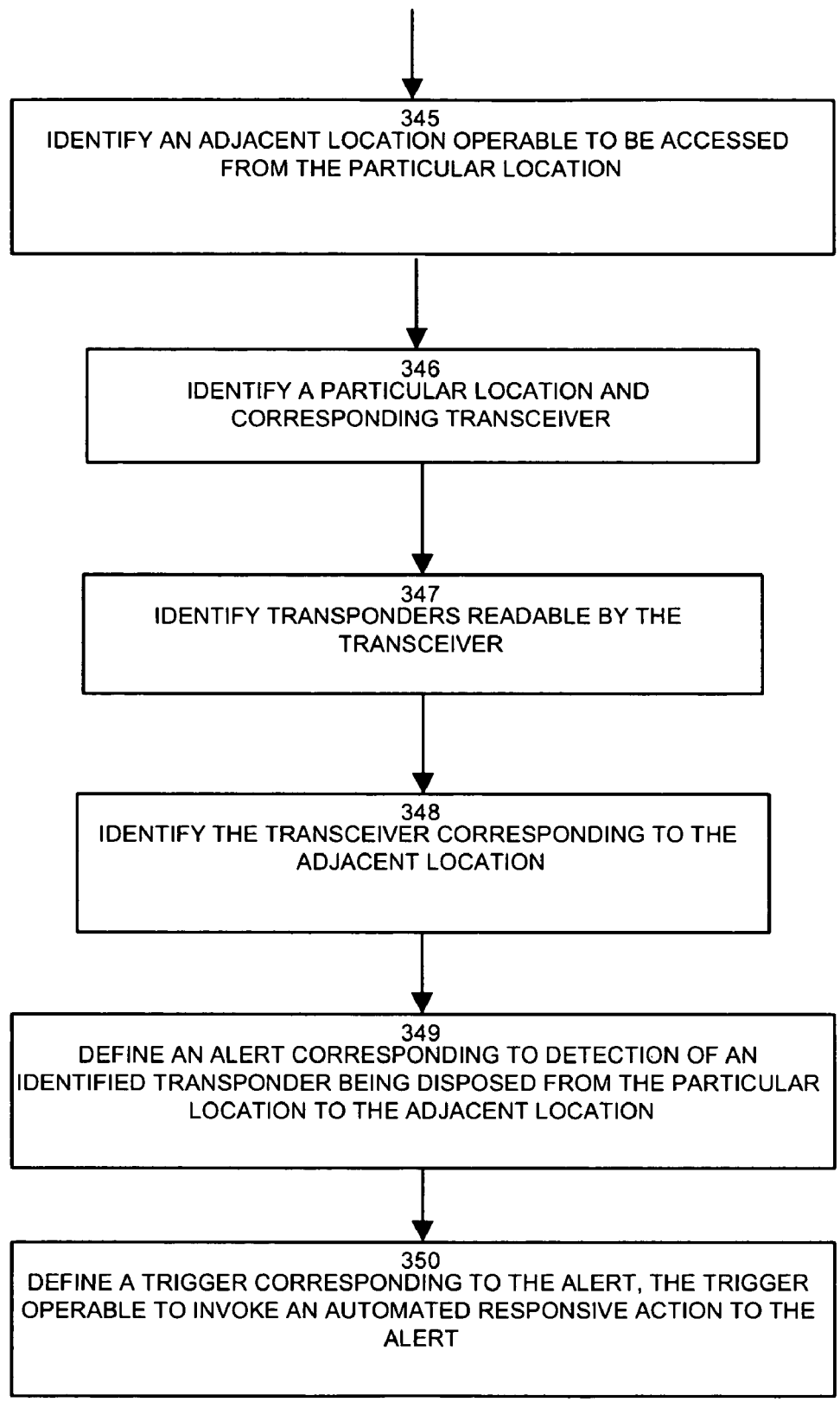
Figure 10:
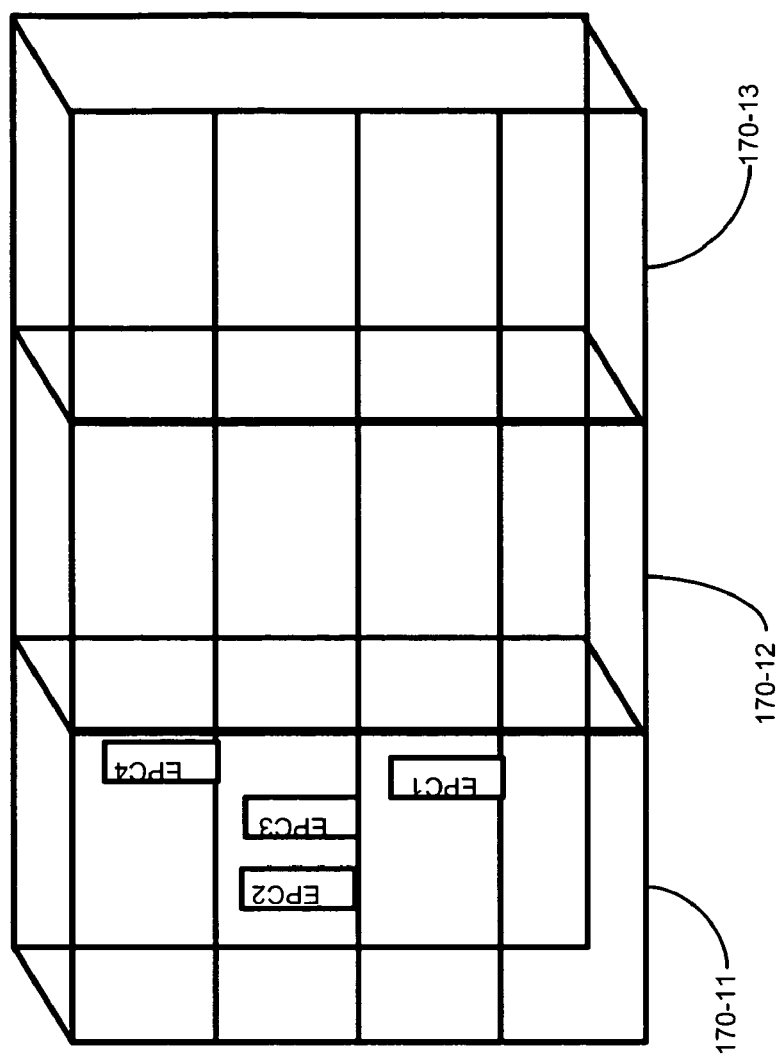
FIG. 10 is an example of RFID deployment in an area having shelf space for RFID identifiable objects.

FIG. 10 is an example of RFID deployment in a area having shelf space for RFID identifiable objects. In this configuration, a bookshelf example provides an exemplary area 100. Referring to FIG. 9, the bookshelf has three locations 170-1 . . . 170-3, or zones, which cover the area 101 defined by the spatial parameters of width (or length) 102, depth 104, and height 106 of 15 ft., 2 ft., and 8 ft. respectively. Accordingly, each location 170 is 5 feet wide by 8 feet high by 2 feet deep, as shown in FIG. 9. Table I illustrates an exemplary code fragment for computing the initial transceiver 120 placement, or baseline, as discussed above at step 311.

FIG. 10 therefore illustrates the use of the deployment application for developing a description of space/volume to optimize transceiver placements. Referring to FIG. 9 and Table I, an RFID field of deployment has its physical space. This physical space can be described with 3-Dimensional geometry. For example a cube can be described with in height, width and depth. A perfect cube has an added property that height, width and depth are all equal. A cylindrical volume can be described in terms of its radius and height. A triangular volume can be described in terms of its triangular area (described with the triangle's base and height) and its height. Table I illustrates an exemplary XML based script file 134 depicting the resulting area generated by the application 132 for inclusion in the script file 134.

The exemplary XML description in Table I describes the topographical configuration of the zones (170), the assigned identifier of the transceiver for the various zones 170 and the physical constraints that exist between these zones 170. Objects within Zone 1 in the above example have to transition to Zone 2 although it need not. Objects within Zone 2 can either transition to Zone 1 or Zone 3 although it need not. Finally Objects within Zone 3 have to transition to Zone 2 although it need not. These Objects can be removed from a particular zone and can be taken straight away to a Point of Sale device. The purpose of this illustration is to show continuity of the tracking operation between zones such that it is easier to compute interactions and relationships at any given time. The exemplary objects contained within a zone, books in this example, may be represented with TABLE II as follows.

TABLE I

```
<Topography>
    <Zone1>
        <Shape>"Cube"</Shape>
        <anchor>x1,y1,z1</anchor>
        <height>x</height>
        <width>y</width>
        <depth>z</depth>
        <transceiverId>"abc"</transceiverId>
        <neighboringZones>"Zone2"</neighboringZones>
    </Zone1>
    <Zone2>
        <Shape>"Cube"</Shape>
        <anchor>x2,y2,z2</anchor>
        <height>x</height>
        <width>y</width>
        <depth>z</depth>
        <transceiverId>"def"</transceiverId>
        <neighboringZones>"Zone1, Zone3"</neighboringZones>
    </Zone2>
    <Zone3>
        <Shape>"Cube"</Shape>
        <anchor>x3,y3,z3</anchor>
        <height>x</height>
        <width>y</width>
        <depth>z</depth>
        <transceiverId>"ghi"</transceiverId>
        <neighboringZones>"Zone2"</neighboringZones>
    </Zone3>
</Topography>
```

TABLE II

| Zone #s | Electronic Product Codes | Description |
| --- | --- | --- |
| 1 | 000011001000101001 | Hamlet By Shakespeare |
| 1 | 000011111000101111 | Short Stories Vol. I by Maugham |
| 1 | 111011111000101111 | Short Stories Vol. II by Maugham |
| 1 | 001011111000101111 | My experiments with truth - M K Gandhi |

The relationships between interacting objects may be expressed in TABLE III as follows:

TABLE III

| Relationship #s | Electronic Product Codes | Triggers |
|---|---|---|
| R1 | EPC1, EPC2 | T1 |
| R2 | EPC3, EPC4 | T2 |
| R3 | EPC1, EPC6 | T1, T2, T3 |
| R4 | EPC2, EPC4 | T1, T2 |

TABLE IV

```
forall $(alienObjects)
    compute $relationships;
    forall $(relationships)
        compute $triggers;
    apply triggers;
    update state;
```

Table IV illustrates a code fragment for processing the real time operations which may performed by the control station in monitoring and tracking the area 101 in FIG. 9. For example, from tables II and III, an object (i.e. book) corresponding to EPC1 and EPC2 from location (zone) 170-1 results in trigger T1. Trigger T1 may be an announcement calculated to appeal to a customer who has just placed Hamlet and Short Stories Vol. I by Maugham in their basket or cart. Similarly, relation r3 causes actions defined by triggers T1, T2, and T2, which are calculated toward a customer placing Hamlet and the object defined by EPC6 (not specifically shown) in their cart. Other relationships and triggers will be apparent to those of skill in the art.

It should be noted that the exemplary implementation discussed above employs an output report as an HTML web page, as is characteristic of typical web based applications. The systems and methods discussed above, including the exemplary parsing and syntax processing of metadata descriptors in a declarative language, are applicable to other output reports from in an information processing environment. Accordingly, the systems and methods discussed above with respect to the exemplary XML output pages are applicable to an alternative scripting or processing format or protocol operable for responsive delivery and display to a user.

Those skilled in the art should readily appreciate that the programs and methods for identifying topology for RFID deployment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for identifying topology for RFID deployment has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for identifying topology for RFID deployment comprising:
   receiving spatial parameters of an area operable for RFID management;
   identifying attributes of a transceiver operable within the area for RFID management, the transceiver operable for communication with a plurality of transponders; and
   determining a location for disposing each a plurality of the transceivers within the area, determining further comprising:
   determining an interference effect based on transponder coverage material between each of the transceivers and a particular transponder;
   computing, based on the identified attributes and the determined interference effect, a readability zone for each of the plurality of transponders indicative of readability by a transceiver; and
   calculating, based on the readability zone and the spatial parameters, placement for each of the transceivers within the area, the calculated placement providing transponder coverage within the area.

2. The method of claim 1 wherein computing the readability zone further comprises:
   identifying spatial modifiers for a particular transceiver;
   applying the identified spatial modifiers to the identified attributes to generate deployment attributes; and
   modifying the placement of at least one of the transceivers according to the generated deployment attributes.

3. The method of claim 1 wherein the identified attributes further include a range, and computing the readability zone includes identifying a reflection from the transponder, further comprising:
   adjusting the readability zone based on an interference effect from the type of transponder coverage material; and
   adjusting the placement of the transponder according the adjusted readability zone and a resulting effect on the range.

4. The method of claim 1 further comprising:
   identifying a plurality of locations in the area, each of the locations having a corresponding transceiver;
   disposing each of the transponders in a particular location, each of the transponders appurtenant to a predetermined object; and
   disposing the corresponding transceiver in each of the identified locations, the transceivers disposed in communication with the transponders disposed in that location.

5. The method of claim 4 wherein disposing the transceivers further comprises: computing the zone of readability for each of the transponders, and
   identifying the locations to include the transponders, each of the transponders in communication with at least one of the transceivers.

6. The method of claim 1 further comprising:
   aggregating, for a plurality of transponders, the readability zone of each of the transponders;
   demarcating a location so as to maximize inclusion of the zone of readability of each of the transponders in the demarcated location; and disposing the transceiver corresponding to the location such that the transceiver is in the zone of readability for a substantial maximum of the transponders in the location.

7. The method of claim 6 further comprising:
identifying a plurality of locations, each location associated with one or more other locations; and
identifying portals connecting one location to another location, the portals defining relations between the locations.

8. The method of claim 1 further comprising defining the spatial parameters to include:
an outer perimeter boundary of the area,
locations defined as portions of the area;
adjacency of each of the locations to other locations; and
physical impediments within the area operable to modify the zone of readability of at least one of the transceivers.

9. The method of claim 1 further comprising arranging a plurality of transceivers such that:
each of the transceivers is disposed in a readability zone corresponding a substantial maximum of transponders;
a substantial minimum number of transceivers are disposed in the area; and
substantially all of the transponders have at least one transceiver in the corresponding zone of readability.

10. The method of claim 1 further comprising:
receiving information concerning the readability zone, spatial parameters, and transponder attributes;
aggregating the received information to compute coverage information indicative of transceivers operable to be disposed in the readability zone of each of the transponders; and
determining placement of transceivers within the area according to the readability zone of each of the transceivers augmented by the aggregated information.

11. The method of claim 10 wherein the received information is transmitted in a predetermined format, the predetermined format adapted to represent an arbitrary arrangement of transceivers, transponders, and areas, further comprising:
displaying the aggregated information to a user in a graphical format, the graphical format operable to illustrate the augmented readability zone for each of the transponders; and
interactively selecting placement of each of the transceivers within the area, the placement operable to generate feedback indicative of transponders having a particular transceiver in the corresponding readability zone.

12. The method of claim 1 further comprising:
identifying a particular location and corresponding transceiver;
identifying transponders readable by the transceiver;
identifying an adjacent location operable to be accessed from the particular location;
identifying the transceiver corresponding to the adjacent location; and
defining an alert corresponding to detection of an identified transponder being disposed from the particular location to the adjacent location.

13. The method of claim 1 further comprising defining a trigger corresponding to the alert, the trigger operable to invoke an automated responsive action to the alert.

14. A computing device for identifying topology for RFID deployment comprising:
a memory operable to store instructions and data;
a processor operable to perform the instructions on the data;
an interface operable to receive the data and send results of performing the instructions, the interface further operable to receiving spatial parameters of an area operable for RFID management;
the instructions operable to employ the data for identifying attributes of a transceiver operable within the area for RFID management, the transceiver operable for communication with a plurality of transponders; and
the processor further operable to determine a location for disposing each a plurality of the transceivers within the area, determining further comprising:
determining an interference effect based on transponder coverage material between each of the transceivers and a particular transponder;
computing, based on the identified attributes and the determined interference effect, a readability zone for each of the plurality of transponders indicative of readability by a transceiver; and
calculating, based on the readability zone and the spatial parameters, placement for each of the transceivers within the area, the calculated placement providing transponder coverage within the area.

15. The computing device of claim 14 wherein the processor is further operable to compute the readability zone by:
identifying spatial modifiers for a particular transceiver;
applying the identified spatial modifiers to the identified attributes to generate deployment attributes; and
modifying the placement of at least one of the transceivers according to the generated deployment attributes.

16. The computing device of claim 14 wherein the identified attributes further include
a range, and the processor is further operable to compute the readability zone by:
identifying a reflection from the transponder;
adjusting the readability zone based on an interference effect from the type of transponder coverage material; and
adjusting the placement of the transponder according the adjusted readability zone and a resulting effect on the range.

17. The computing device of claim 14 wherein the instructions are further operable to:
identify a plurality of locations in the area, each of the locations having a corresponding transceiver;
specify disposing each of the transponders in a particular location, each of the transponders appurtenant to a predetermined object; and
specify disposing the corresponding transceiver in each of the identified locations, the transceivers disposed in communication with the transponders disposed in that location.

18. The computing device of claim 17 wherein the instructions are further operable to:
specify disposing the transceivers further comprises: computing the zone of readability for each of the transponders, and
identify the locations to include the transponders, each of the transponders in communication with at least one of the transceivers.

19. The computing device of claim 14 wherein the processor is further operable to:
aggregate, for a plurality of transponders, the readability zone of each of the transponders;
demarcate a location so as to maximize inclusion of the zone of readability of each of the transponders in the demarcated location; and indicate disposing the transceiver corresponding to the location such that the transceiver is in the zone of readability for a substantial maximum of the transponders in the location.

20. The computing device of claim 19 wherein the processor is further operable to:
identify a plurality of locations, each location associated with one or more other locations; and
identify portals connecting one location to another location, the portals defining relations between the locations.

21. The computing device of claim 14 wherein the processor is further operable to define the spatial parameters to include:
an outer perimeter boundary of the area,
locations defined as portions of the area;
adjacency of each of the locations to other locations; and
physical impediments within the area operable to modify the zone of readability of at least one of the transceivers.

22. The computing device of claim 14 wherein the instructions are further operable to indicate arranging a plurality of transceivers such that:
each of the transceivers is disposed in a readability zone corresponding a substantial maximum of transponders;
a substantial minimum number of transceivers are disposed in the area; and
substantially all of the transponders have at least one transceiver in the corresponding zone of readability.

23. The computing device of claim 14 wherein the interface is further operable to receive information concerning the readability zone, spatial parameters, and transponder attributes, and the processor is further operable to:
aggregate the received information to compute coverage information indicative of transceivers operable to be disposed in the readability zone of each of the transponders; and
determine placement of transceivers within the area according to the readability zone of each of the transceivers augmented by the aggregated information.

24. The computing device of claim 23 wherein the received information is transmitted in a predetermined format, the predetermined format adapted to represent an arbitrary arrangement of transceivers, transponders, and areas, wherein the processor is further operable to:
display the aggregated information to a user in a graphical format, the graphical format operable to illustrate the augmented readability zone for each of the transponders; and
interactively select placement of each of the transceivers within the area, the placement operable to generate feedback indicative of transponders having a particular transceiver in the corresponding readability zone.

25. The computing device of claim 14 wherein the processor is further operable to:
identify a particular location and corresponding transceiver;
identify transponders readable by the transceiver;
identify an adjacent location operable to be accessed from the particular location;
identify the transceiver corresponding to the adjacent location; and
define an alert corresponding to detection of an identified transponder being disposed from the particular location to the adjacent location.

26. The computing device of claim 14 wherein the processor is further operable to define a trigger corresponding to the alert, the trigger operable to invoke an automated responsive action to the alert.

27. A computer program product having a computer readable storage medium operable to store computer program logic embodied in computer program code encoded thereon, that, when executed by a processor, cause the computer to perform steps for identifying topology for RFID deployment comprising:
computer program code for receiving spatial parameters of an area operable for RFID management;
computer program code for identifying attributes of a transceiver operable within the area for RFID management, the transceiver operable for communication with a plurality of transponders; and
computer program code for determining a location for disposing each a plurality of the transceivers within the area, determining further comprising:
determining an interference effect based on transponder coverage material between each of the transceivers and a particular transponder; computing, based on the identified attributes and the determined interference effect, a readability zone for each of the plurality of transponders indicative of readability by a transceiver; and
calculating, based on the readability zone and the spatial parameters, placement for each of the transceivers within the area, the calculated placement providing transponder coverage within the area.

28. An information processing device for identifying topology for RFID deployment comprising:
means for receiving spatial parameters of an area operable for RFID management;
means for identifying attributes of a transceiver operable within the area for RFID management, the transceiver operable for communication with a plurality of transponders; and
means for determining a location for disposing each a plurality of the transceivers within the area, determining further comprising:
determining an interference effect based on transponder coverage material between each of the transceivers and a particular transponder;
computing, based on the identified attributes and the determined interference effect, a readability zone for each of the plurality of transponders indicative of readability by a transceiver; and
calculating, based on the readability zone and the spatial parameters, placement for each of the transceivers within the area, the calculated placement providing transponder coverage within the area.

* * * * *